United States Patent [19]

Neijzen et al.

[11] Patent Number: 5,748,374
[45] Date of Patent: May 5, 1998

[54] PICTURE DISPLAY DEVICE

[75] Inventors: Jacobus H. M. Neijzen; Adrianus J. S. M. De Vaan; Martinus V. C. Stroomer, all of Eindhoven, Netherlands

[73] Assignee: U.S. Philips Corporation, New York, N.Y.

[21] Appl. No.: 757,530

[22] Filed: Nov. 27, 1996

[30] Foreign Application Priority Data

Dec. 1, 1995 [EP] European Pat. Off. ............ 95203312

[51] Int. Cl.$^6$ ............................................ G02B 27/10
[52] U.S. Cl. .................................. 359/621; 359/455
[58] Field of Search ........................... 357/619, 621, 357/455

[56] References Cited

U.S. PATENT DOCUMENTS 5,184,248  2/1993  de Vaan et al. ............... 359/483
5,504,597  4/1996  Sprague et al. ................. 359/40

FOREIGN PATENT DOCUMENTS

0444871A2  9/1991  European Pat. Off. ......... H04N 5/74
0518362A1  12/1992  European Pat. Off. ......... G02F 1/1335

Primary Examiner—Georgia Y. Epps
Assistant Examiner—Thomas Robbins
Attorney, Agent, or Firm—Walter M. Egbert

[57] ABSTRACT

A picture display device is disclosed having an illumination system and a picture display panel which is provided with a matrix of n panels and has a pitch $p_p$. The device further has a projection lens system for projecting light modulated by the picture display panel to form an image. The illumination side of the picture display panel is provided with a microlens array having m microlenses and a pitch $p_m$. The illumination system includes N illumination elements which are arranged in an array and have pitch $p_1$. The illumination elements generate light simultaneously. Moreover, $N << m, n$ and $p_1 >> p_m, p_p$.

4 Claims, 11 Drawing Sheets

PICTURE DISPLAY DEVICE

BACKGROUND OF THE INVENTION

The invention relates to a picture display device comprising an illumination system, a picture display panel which is provided with a matrix of n pixels and has a pitch $p_p$, and a projection lens system, the illumination side of the picture display panel being provided with a microlens array comprising m microlenses and having a pitch $p_m$.

A picture display device of the type described in the opening paragraph is known from, for example, European Patent Application EP 0 444 871. The picture display device described in this Application comprises an illumination system for generating a light beam. This light team is subsequently modulated by a liquid crystalline picture display panel in conformity with picture information to be displayed. The picture display panel is constituted by a liquid crystalline layer and is provided with pixels arranged in a two-dimensional array. The two optically transparent plates between which the liquid crystalline layer is present are provided with electrodes, by means of which the pixels are provided with picture information. Subsequently, the modulated beam coming from the picture display panel is projected to form an image by means of a projection lens system. A pixel consists of an active portion which actually switches, and a passive portion. The ratio between the active and the passive portion of the pixels defines the geometrical aperture of the picture display panel.

In current LCD projection systems, the aim is miniaturization in order to lower the cost prick. However, if the picture display panels are reduced in size, while maintaining the resolution, the geometrical aperture of the picture display panels will decrease. Due to this limited aperture, the light losses may be considerable in a picture display device having a liquid crystalline picture display panel, so that the light output of the system decreases. For this reason, a microlens array is arranged at the illumination side of the picture display panel, as described in said Patent Application. A microlens of the microlens array corresponds to each pixel of the picture display panel, while a maximal quantity of light incident on the microlens is concentrated on the active portion of the corresponding pixel.

A drawback of the picture display device described in said European Patent Application is that the throughput of the system is limited by the thickness of the substrate of the picture display panel at the illumination side and the dimensions of the active portion of the pixels. The term throughput is understood to mean the power of an optical system to transport radiation energy. This power is determined by the combination of a geometrical aperture and the pupil at the same location in the optical system and may be expressed as the product of the surface of the aperture and the spatial angle subtended by the pupil in the center of the aperture.

To be able to realize a maximal throughput in the above-mentioned picture display device, the diameter of the sub-beam incident via a microlens on a corresponding pixel should correspond as much as possible at the area of the picture display panel to the dimension of the active portion of this pixel, and the divergence of the beam incident on the pixel should not be larger than the divergence allowed by the electro-optical effect. The beam diameter at the area of the picture display panel depends on the divergence of the beam which is incident on a microlens and on the thickness of the substrate at the illumination side of the picture display panel. The divergence of the beam incident on a microlens is in turn a determined by the ratio between the lamp surface and the panel surface. However, the parameters mentioned above cannot always be adapted because they are generally fixed during assembly of the device. If the beam diameter per pixel is too large at the area of the picture display panel, at least a part of the light beam will be incident on the passive pixel portion, with light loss as a result. This has the further drawback of thermal load of the picture display panel. Light which is incident on the passive portions heats the panel. This is a problem, particularly in picture display devices having powerful light sources.

It follows from the above that the realization of the desired divergence for a beam incident on a microlens yields problems, inter alia, in small picture display panels. Moreover, the same problem occurs in picture display panels having relatively small pixels. The pixels become smaller, the geometrical aperture of the pixels thereby decreases and the divergence of the light incident on the picture display panel increases.

SUMMARY OF THE INVENTION

It is an object of the invention to provide a picture display device whose picture display panel is preceded by a microlens array in which the throughput is considerably larger as compared with known picture display devices with a single microlens array in front of the picture display panel, and is not limited by the allowed divergence for a beam incident on a microlens.

To this end, the picture display device according to the invention is characterized in that the illumination system comprises N illumination elements which are arranged in an array, have a pitch $p_1$ and generate light simultaneously, in which $N<<m$, n and $p_1>>P_m$, $P_p$.

In this manner, each pixel is illuminated via N microlenses and the light coming from one microlens is incident on N pixels. This means that the throughput per microlens is raised by a factor of N.

The present invention is based on the recognition that the electro-optical effect in the picture display panel, or possibly the desired aperture of the projection lens, preferably defines the spatial angle within which the light rays must be incident on a pixel so as to contribute to the formation of a picture, rather than the divergence which a beam incident on a microlens may have. The spatial angle imposed by the electro-optical effect is the angle within which light rays should be incident on a pixel so as to be able to undergo the desired modulation associated with this pixel. It is very common practice that there is a factor of ten difference between the allowed divergence due to the electro-optical effect and the divergence allowed for a beam incident on a microlens. Thus, if the spatial angle allowed by the electro-optical effect of the picture display panel is, for example, a factor of ten larger than that allowed for a microlens, the present invention proposes to fill up the allowed spatial angle per pixel with light rays coming from different microlenses, for example, ten in an array of arranged microlenses for said example. This is achieved by irradiating the microlens corresponding to a pixel with ten illumination elements arranged in a two-dimensional array. It is then sufficient that the number of illumination elements is many orders smaller than the number of pixels and the number of microlenses. The array of illumination elements has a much larger pitch than the pitch of the microlens array and the pitch of the picture display panel. The factor with which the throughput is increased is equal to the number of illumination elements N.

In this manner, the picture display panel can be reduced in size until the electro-optical effect of the picture display panel has a limiting influence again, while the throughput and the resolution are maintained. On the other hand, the resolution may be increased so that a sharper image can be realized, while the dimension of the picture display panel and the throughput are maintained. A higher throughput than usual may also be realized so that a brighter image is obtained, while the dimensions of the picture display panel and the pixels are maintained.

It is to be noted that European Patent Application EP 0 518 362 describes picture display device in which an array of virtual light sources is arranged in front of the microlens array which concentrates light on the active pixel portions of the picture display panel, which array has a pitch which is equal to the pitch of the microlens array and to that of the picture display panel and whose number is equal to the number of microlenses and the number of pixels. A drawback of this device is that, notably for picture display panels having small pixels, not only the microlenses but also the illumination elements should be very small and substantially identical, a fact which tends to complicate the manufacturing procedure.

A further embodiment of the picture display device according to the invention is characterized in that the microlens array and the picture display panel are arranged in a telecentric configuration.

It is thereby achieved that the relative positions of the microlenses of the microlens array and the pixels of the picture display panel are independent of the location on the picture display panel.

A preferred embodiment of the picture display device according to the invention is characterized in that it holds for the pitch $p_i$ of the array of illumination elements and the pitch $p_p$ of the picture display panel that:

$$M \cdot p_i = p_p$$

and for the pitch $p_m$ of the microlens array and the pitch $p_p$ of the picture display panel:

$$p_m = x \cdot p_p$$

in which M is the magnification of the microlens array and x is an integer.

Under this condition, the illumination elements associated with the array -are suitably imaged on the pixels of the picture display panel, so that light loss remains limited to a minimum. To this end, the mutual distance between two illumination elements after imaging should be equal to the pitch $p_p$ of the picture display panel.

The pitch of the pixels and the pitch of the microlenses may be equal (x=1), or the pitch of the microlenses may be a multiple of the pixels (x>1). The advantage of the latter possibility is that the microlenses can be given a slightly larger size so that their manufacture is less cumbersome, particularly for very small pixel dimensions.

If the configuration is not telecentric, the pitches $P_m$ and $p_p$ should be adapted to each other so as to maintain the desired correspondence between the microlenses and the pixels. In fact, the chief ray of the beam illuminating a microlens is no longer perpendicular to the assembly of microlens array and picture display panel.

A further embodiment of the picture display device according to the invention is characterized in that the illumination elements have a radiation surface with a shape corresponding to the shape of the active portions of the pixels of the picture display panel.

Consequently, the active portions of the pixels of the picture display panel are utilized as optimally as possible.

A further embodiment of the picture display device according to the invention is characterized in that the illumination system comprises an integrator system with a first lens plate and a second lens plate each comprising a plurality of lenses arranged in an array, the lenses of the second lens plate constituting an array of illumination elements.

Each illumination element is now constituted by a lens of the second lens plate of the integrator system. An advantage is that, due to the presence of the integrator system, the intensity will be homogeneously distributed across the picture. Moreover, with the aid of the integrator system, the shape of the beam coming from the light source can be converted into the shape of the picture display panel. For example, a beam having a circular cross-section can be converted into a beam having a rectangular cross-section, with an aspect ratio corresponding to that of the picture display panel, for example, 4:3.

Another embodiment of the picture display device according to the invention is characterized in that the illumination system comprises an integrator system with a first lens plate and a second lens plate each comprising a plurality of lenses arranged in an array, the illumination elements being constituted by a group of adjoining lenses of the second lens plate.

An illumination element may alternatively be constituted by the assembly of a plurality of adjoining lenses of the second lens plate.

These and other aspects of the invention will be apparent from and elucidated with reference to the embodiments described hereinafter.

DESCRIPTION OF THE PREFERRED EMBODIMENTS

Figure 1:
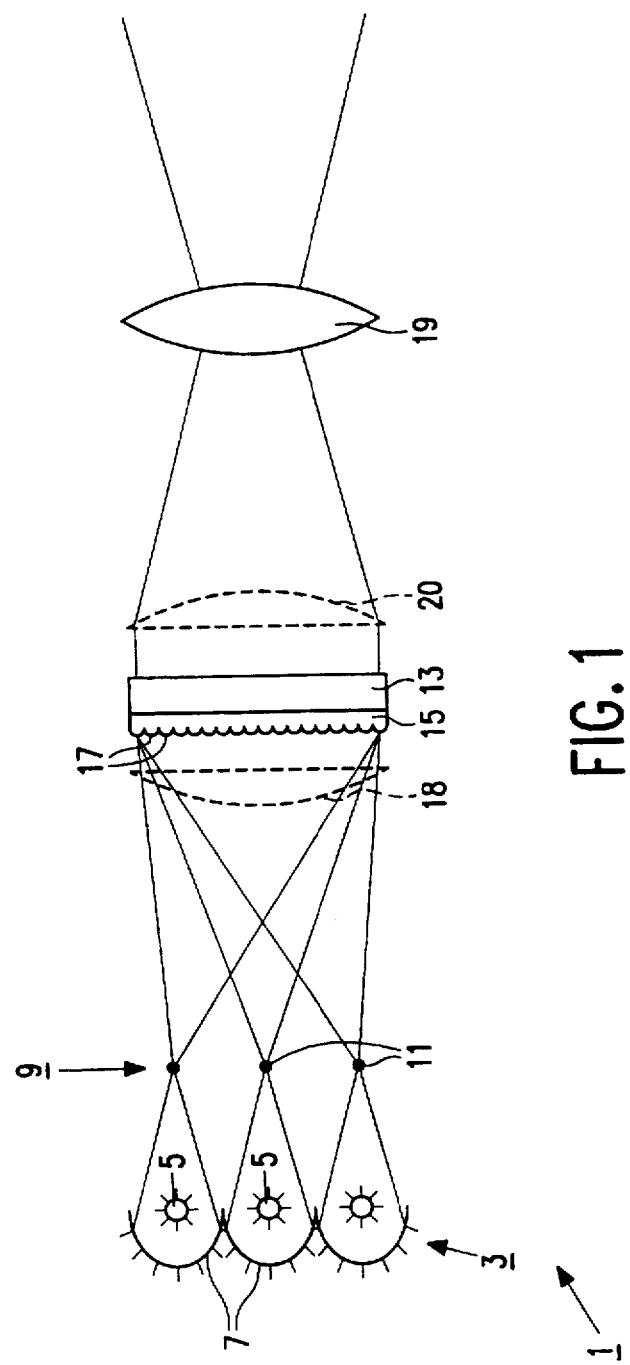
FIG. 1 shows an embodiment of a picture display device according to the invention.

The picture display device 1 shown diagrammatically in FIG. 1 comprises an illumination system 3 which consists of a plurality of light sources 5 arranged in an array. Each light source is surrounded by a reflector 7, for example an elliptic reflector. Such a reflector 7 ensures that the greater part of the light emitted by the light source 5 reaches the picture display device as much as possible. The light sources 5 in combination with the reflectors 7 ensure that an array 9 of illumination elements 11 separated from each other is formed.

Moreover, the picture display device 1 has a picture display panel 13. The picture display panel 13 may comprise, for example a liquid crystalline material and a matrix of pixels whose operation is based on the twisted-nematic (TN), the super-twisted nematic (STN) or the ferroelectric effect so as to modulate the direction of polarization of light incident thereon in conformity with picture information to be displayed. On the other hand, the operation of the picture display panel may also be based on dispersion of incident unpolarized light such as, for example, in a polymer dispersed liquid crystal (PDLC). In all these cases, the layer of liquid crystalline material is provided, for example, between two optically transparent substrates of, for example, glass or a synthetic material on which an electrode structure is provided so as to provide each pixel with picture information to be displayed.

Each pixel consists of an active portion which actually switches, and a passive portion. The ratio between the active and passive portion per pixel defines the geometrical aperture of the picture display panel. Due to a limited aperture, the light losses may be considerable in a picture display device comprising a liquid crystalline picture display panel. For this reason, a microlens array 15 with microlenses 17 in the light path between the illumination system 3 and the picture display panel 13 is often used so as to concentrate a maximal quantity of light from the illumination system 3 on the active portions of the pixels of the picture display panel 13. The focal plane of the microlens array is located in the picture display panel.

The light modulated by the picture display panel 13 is subsequently projected to form an image by a projection lens system 19 illustrated, for the sake of simplicity, by a single projection lens.

When using a microlens array, the throughput of the picture display device will not only be limited by the geometrical aperture of the picture display panel and by the divergence allowed by the electro-optical effect, but also by the divergence of the light beam incident on the microlenses. To be able to realize a maximal throughput, the diameter of the sub-beam incident on a given pixel should correspond as much as possible at the area of the picture display panel to the dimension of the active portion of this pixel. The beam diameter at the area of the picture display panel depends on the divergence of the beam which is incident on a microlens and on the thickness of the substrate at the illumination side of the picture display panel. The divergence of the beam incident on a microlens is in turn determined by the ratio between the lamp surface and the panel surface. However, the parameters mentioned above cannot always be adapted.

The dimension of the beam at the area of the picture display panel should be substantially equal to or smaller than the dimension of the active pixel portion. If this is not the case, light will also be incident on the passive pixel portion, resulting in light loss and heating of the panel. The present invention recognizes that the limitation regarding the divergence of the incident light beam can be solved by illuminating each pixel of the picture display panel via more than one microlens and by having each microlens illuminate more than one pixel. This is achieved by making use of a plurality (N) of illumination elements 11 which emit light simultaneously, instead of a single light source. In FIG. 1, each illumination element is implemented as a separate light source. Other possibilities, with which an array of illumination elements can be realized, will hereinafter be illustrated.

A field lens 18, 20 may be present in front of or behind the combination of microlens array 15 and picture display panel 13. This provides the possibility of utilizing the aperture of the projection lens to an optimum extent. Moreover, it will then be sufficient to use a projection lens having a smaller aperture, as compared with the case where the field lens is absent.

It is alternatively possible to arrange a field lens both in front of and behind the above-mentioned combination. In addition to the optimum utilization of the aperture of the projection lens, the two field lenses 18, 20 ensure that a telecentric illumination is realized. In this manner it is achieved that the relative positions of the microlenses of the microlens array and the pixels of the picture display panel are independent of the position on the picture display panel. Since the field lenses 18, 20 are optional, they are shown in broken lines in FIGS. 1, 6a and 6b.

Figure 2:
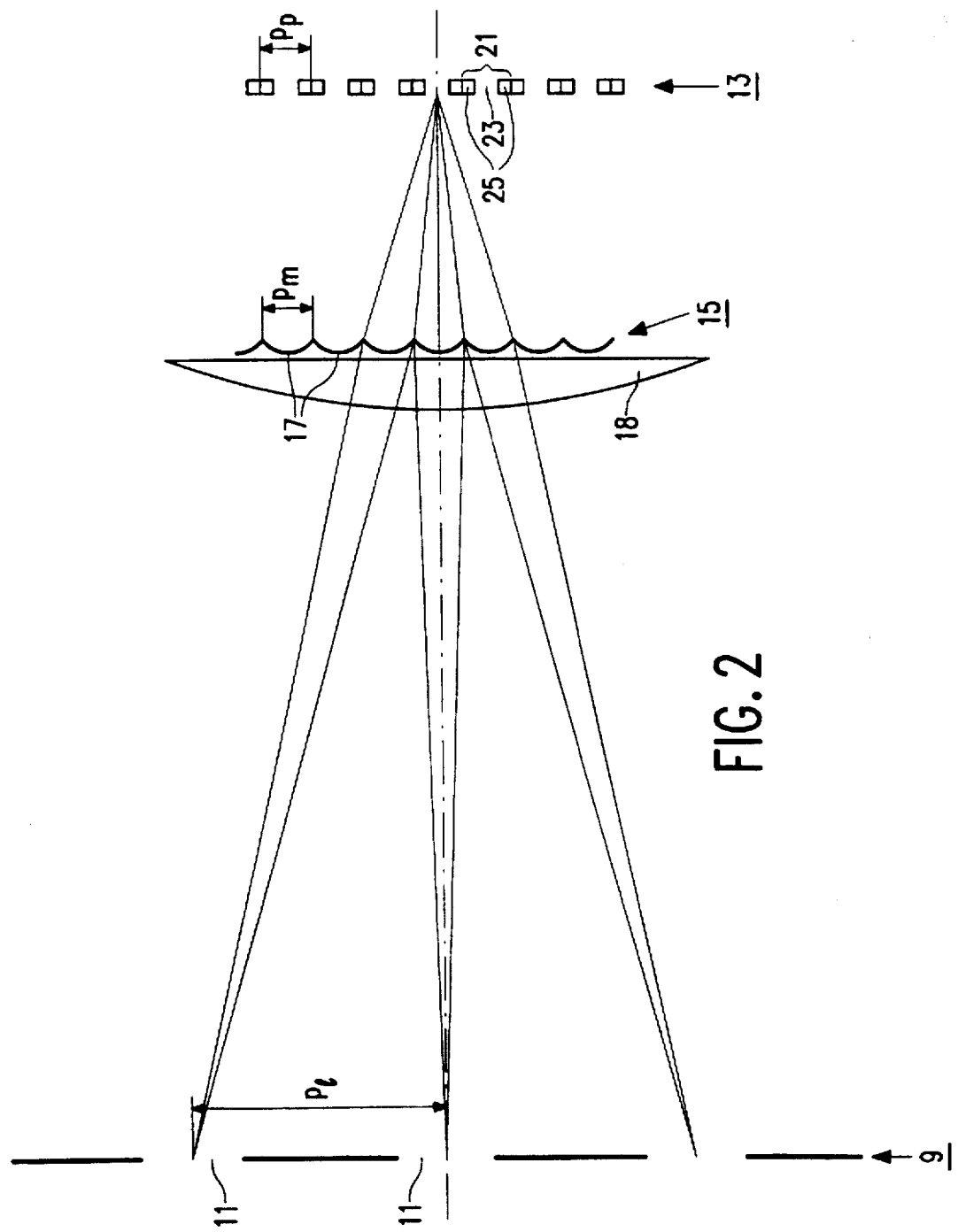
FIGS. 2 and 3 show embodiments of a part of a picture display device according to the invention, showing that one pixel is illuminated by more than one microlens.

FIG. 2 shows, in a cross-section, the correspondence between the number of illumination elements 11, the number of microlenses 17 and the number of pixels 21 of the picture display panel 13. To realize a maximal throughput in the picture display device, it should hold in the case of a telecentric configuration that:

$M \cdot p_1 = p_p$ $p_m = x \cdot p_p$ in which M is the magnification of the microlens array and x is an integer. This means that, after imaging, the illumination elements coincide with pixels of the picture display panel and that the pitch $p_m$ of the microlens array should be equal to (x=1) or is an integral multiple (x>1) of the pitch $p_p$ of the picture display panel.

Figure 10:
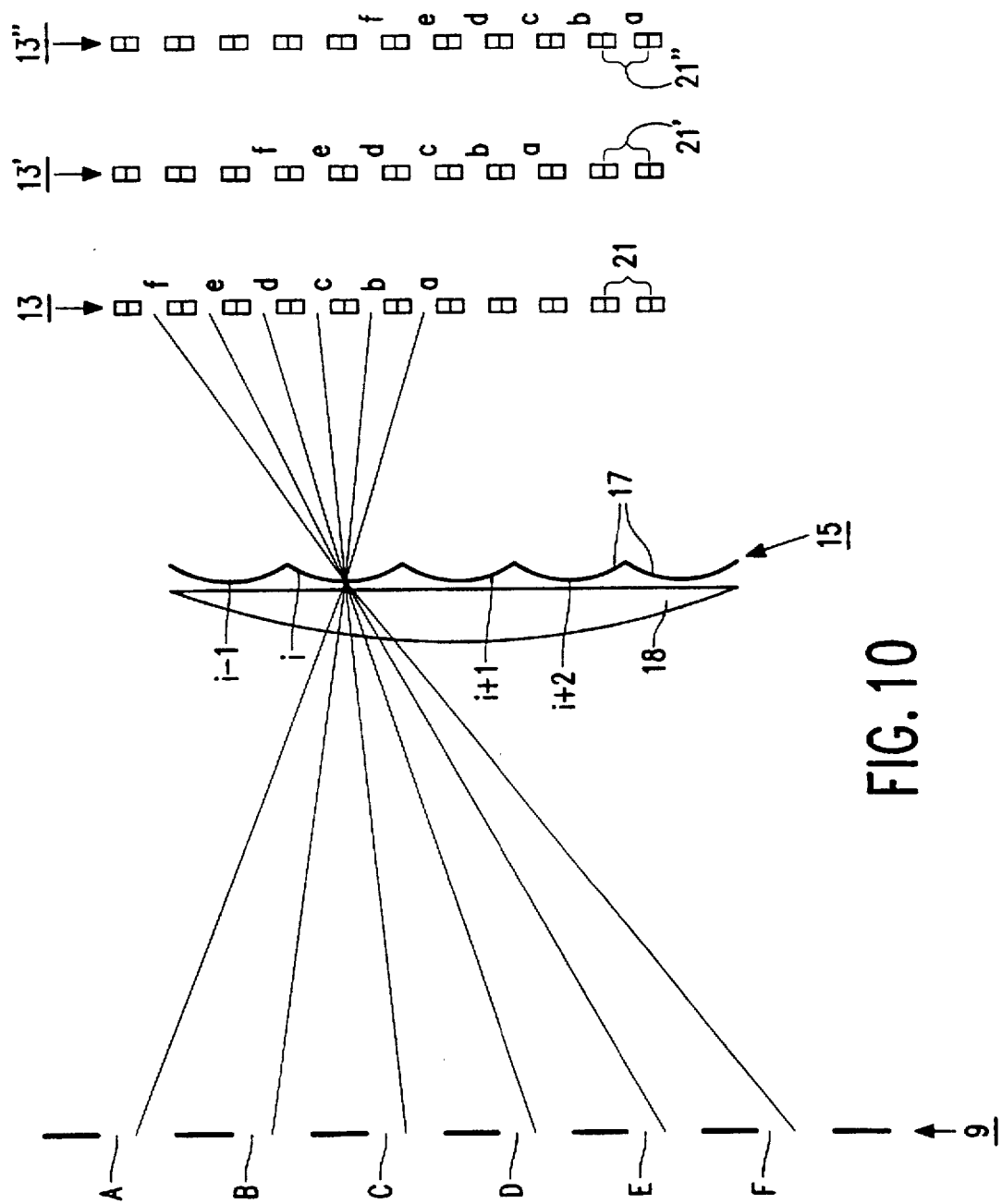
FIG. 10 shows another embodiment of a picture display device according to the invention.

For example, one pixel 21 of the picture display panel 13 may correspond to each microlens 15. The pitch $p_m$ of the microlens array is then equal to the pitch $p_p$ of the picture display panel 13 (x=1). It is, for example, also possible that more than one pixel of the picture display panel corresponds to one microlens (x>1). If one microlens corresponds to more than one pixel, the microlenses may be given a larger size, so that they can be manufactured more easily. This is advantageous, particularly in picture display panels with small pixels. In this case, the pitch $p_m$ of the microlens array is larger than the pitch of the picture display panel $p_p$. An example is illustrated in FIG. 10.

If the configuration is not telecentric, the pitches $p_m$ and $p_p$ should be adapted to each other, because the chief ray of a beam incident on a microlens is no longer perpendicular to the assembly of microlens array and picture display panel.

The picture display panel 13 comprises n pixels 21 which are arranged in a matrix, and the microlens array 15 comprises m microlenses 17. A pixel 21 of the picture display panel 13 consists of an active portion 23 which actually switches, and a passive portion 25. The geometrical aperture of the picture display panel is determined by the ratio between the surface of the active portion and the surface of the passive portion.

The electro-optical effect in the picture display panel, and possibly the aperture of the projection lens, should define the spatial angle within which the light rays must be incident on a pixel so as to contribute to the formation of the image. As a result of the limited divergence which is allowed for light rays incident on the microlenses in order that a minimal quantity of light is incident on the passive pixel portions, this spatial angle cannot be fully filled up by light rays coming from a single microlens. For this reason, the present invention proposes to fill up the spatial angle associated with one pixel with light rays coming from several microlenses. This is achieved by using, instead of a single light source, a split light source with a plurality of illumination elements N emitting light simultaneously. In this way, the throughput is increased by a factor which is equal to the number of illumination elements 11. The divergence allowed by the electro-optical effect and geometrical factors such as the thickness of the substrates of the picture display panel and the pixel dimensions define the factor which can be realized. A factor of ten difference between the divergence allowed by the electro-optical effect and the divergence allowed for a beam incident on the microlens is very common. Thus, if the spatial angle allowed by the electro-optical effect of the picture display panel is a factor of ten larger than that allowed for a beam incident on a microlens, it is proposed to fill up the allowed spatial angle per pixel with light rays coming from several microlenses. This effect is achieved by irradiating a microlens with a number of illumination elements, for example ten elements, which are arranged in a two-dimensional array. The configuration of the illumination elements within this array may be symmetrical but is not necessary. In fact, not every electro-optical effect is symmetrical such as, for example, the TN effect. Those angles of light incidence on the picture display panel are preferably realized for which the electro-optical effect yields the optimum picture contrast.

It is sufficient that the number (N) of illumination elements 11 is many orders smaller than the number of pixels 21 and the number of microlenses 17 (N<<m, n). The pitch $p_1$ of the array 9 of illumination elements 11 is much larger than the pitch $p_m$ of the microlens array and the pitch $p_p$ of the picture display panel 13 ($p_1 >> p_m$, $p_p$).

Figure 3:
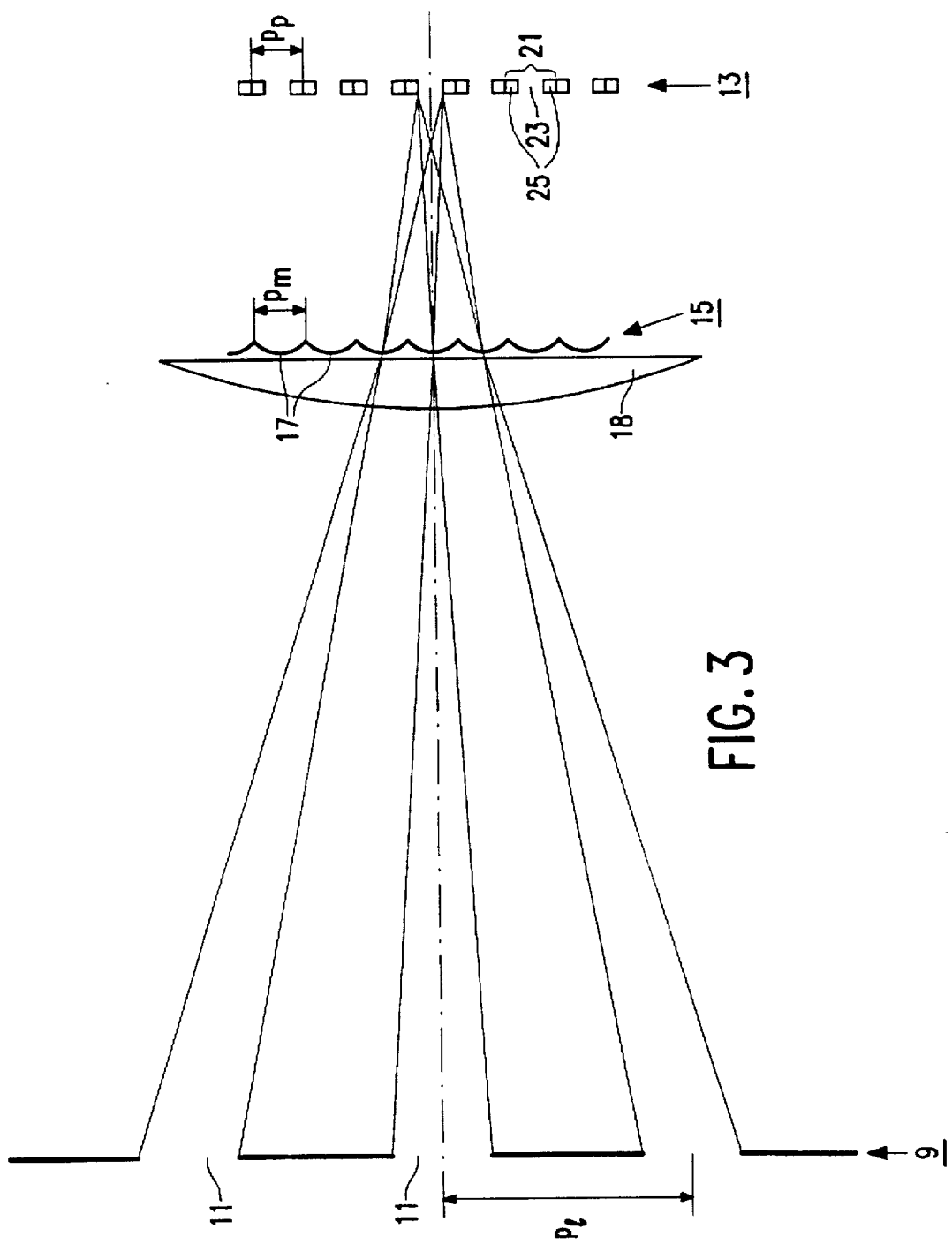

FIGS. 2 and 3 illustrate how three light beams coming from three different illumination elements each illuminate a microlens and subsequently one single pixel. FIG. 2 shows the image of a point located within an illumination element on a point within an active pixel portion of the picture display panel. FIG. 3 shows how the dimension of each illumination element, on the one hand, and the dimension of the active pixel portion, on the other hand, should be adapted to each other. In this adaptation, the magnification M of the microlens array is of course to be taken into account.

Figure 4:
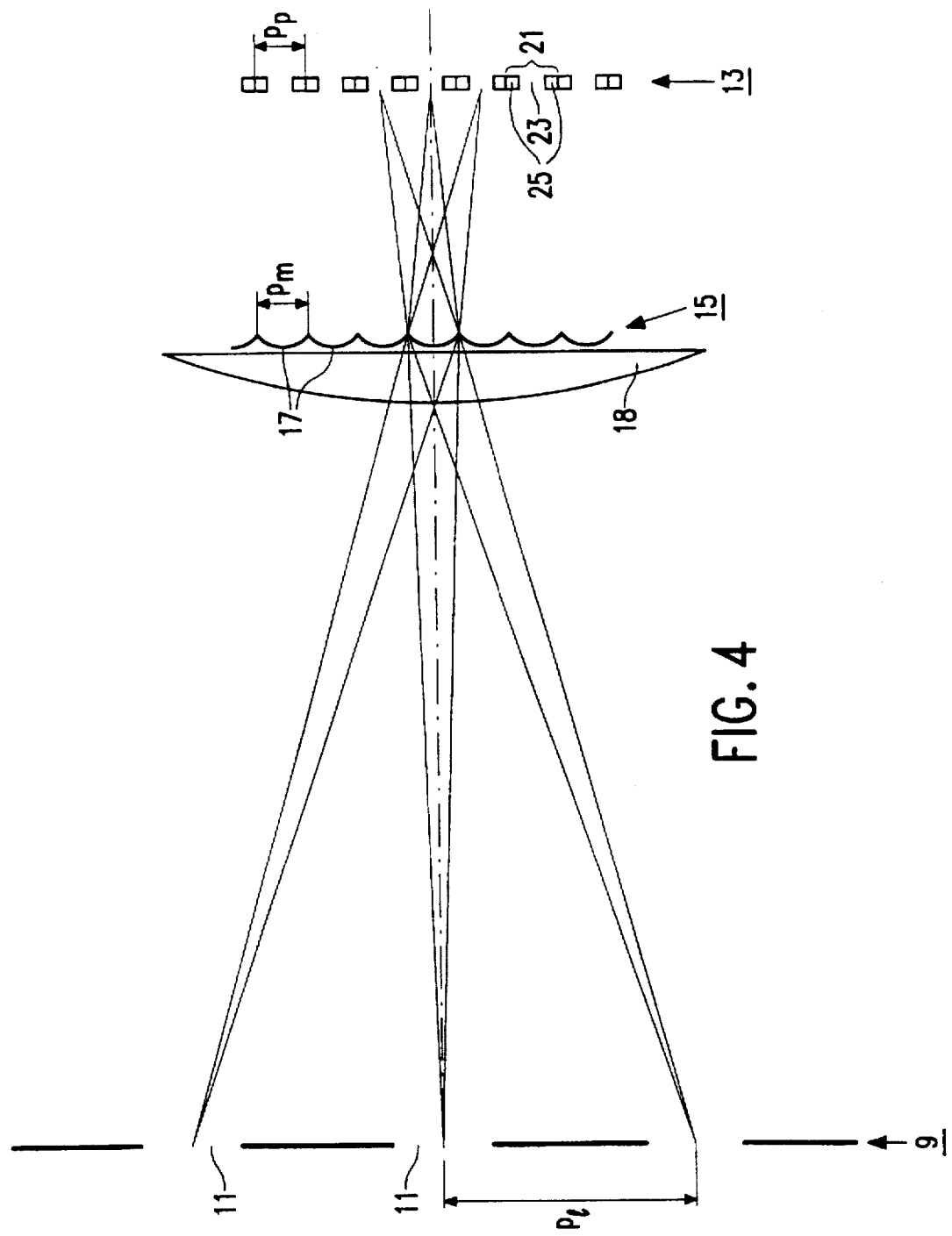
FIGS. 4 and 5 show embodiments of a part of the picture display device according to the invention, showing that one microlens illuminates more than one pixel.
Figure 5:
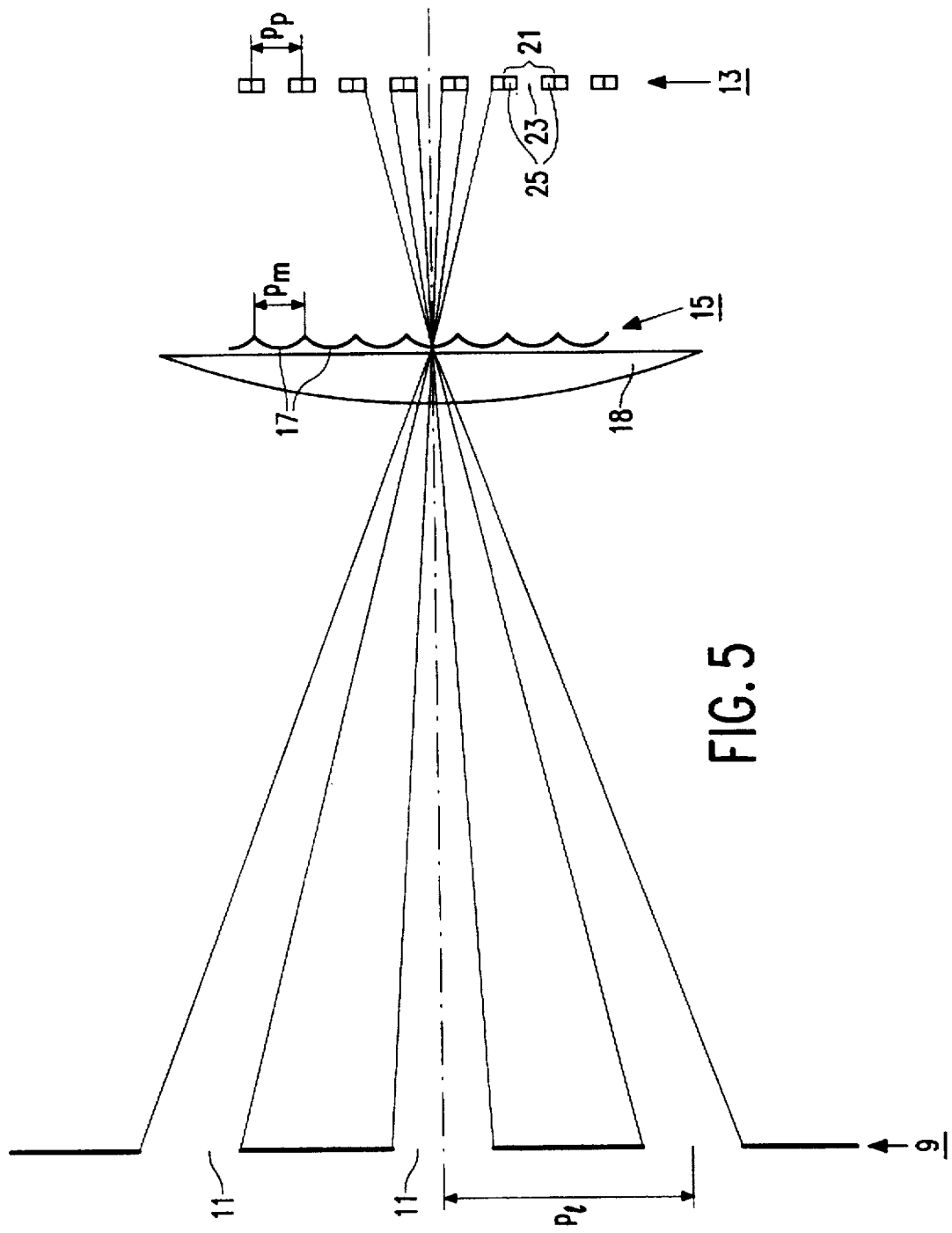

FIGS. 4 and 5 show how three light beams coming from three different illumination elements illuminate three different pixels via a single microlens. In FIG. 4, one point of each illumination element of the three different illumination elements is imaged on one point in the three different pixels. FIG. 5 shows the relation between the dimensions of the illumination elements and the dimensions of the active portion of a pixel.

Figure 6A:
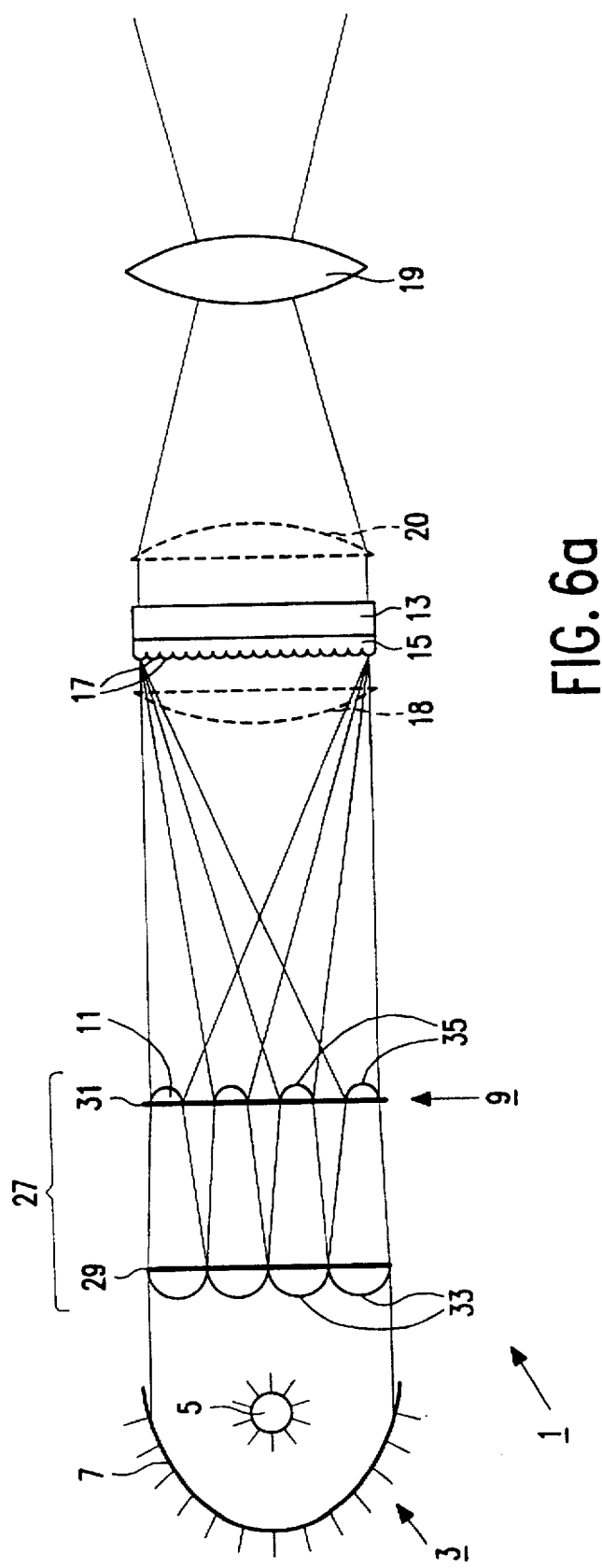
FIGS. 6a and 6b show embodiments of a picture display device according to the invention, in which the illumination elements are constituted by lenses or groups of lenses of the second lens plate of an integrator system.
Figure 6B:
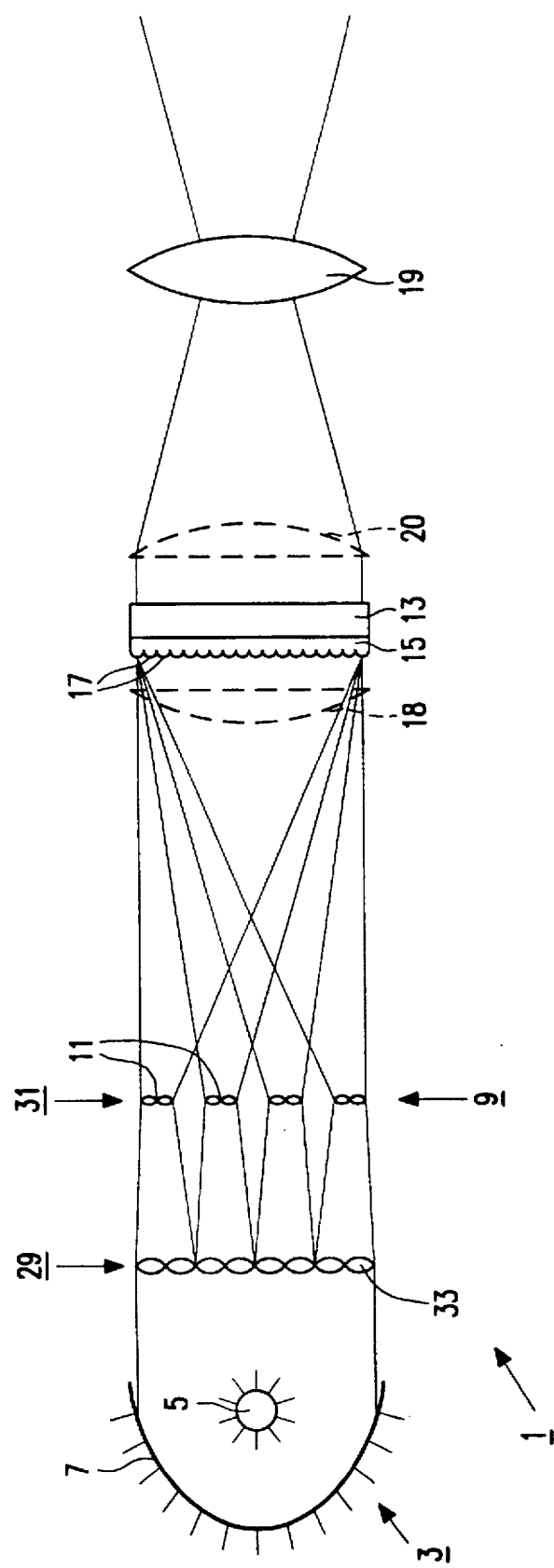

The array of illumination elements which are separated from each other may be realized, for example, by an array of light sources as shown in FIG. 1. Other ways of realizing such an array are shown in FIGS. 6a and 6b. Now, the illumination system 3 comprises one light source 5 which is partly surrounded by a reflector 7 ensuring that a maximal quantity of light from the light source 5 reaches the device. The reflector 7 may be, for example, a parabolic reflector so that a collimated light beam is formed. The reflector may alternatively be a spherical reflector in combination with a condensor lens so that also a collimated beam is obtained. Moreover, the illumination system 3 is provided with a lens system 27 comprising a first lens plate 29 and a second lens plate 31, referred to as integrator system. At the side facing the light source 5, the first lens plate 29 is provided with an array of lenses 33 and the other side is preferably plane. Each of these lenses 33 images the light source 5 on an associated lens 35 of the second lens plate 31. The side of the second lens plate 31 facing the light source 5 is preferably plane, whereas the other side is provided with an array of lenses 35. The number of rows and columns of lenses of the first lens plate 29, for example, corresponds to that of the second lens plate 31. For imaging the light source 5 on the corresponding lenses 35 by means of the different lenses 33, a different portion of the beam incident on the first lens plate 29 is used each time. In this way, a number of illumination elements 11 corresponding to the number of lenses 35 of the second lens plate 31 is formed, which elements are separated from each other. The lens configurations of the first lens plate 29 and the second lens plate 31 can be different from each other, such as for example in U.S. Pat. No. 5,184,248.

In the first lens plate 29 it is important that the lenses 31 adjoin each other so as to receive as much light as possible from the light source or light sources. However, the illumination elements 11 should be separated from each other. Moreover, a lens or a prism system (not shown) may be present behind the second lens plate 31. It is thereby ensured that all re-images in the plane of the picture display panel 13 are superimposed on each other so that it can be achieved that the illumination power in that plane has the desired uniformity, the extent of uniformity being determined by the number of lenses of the plates 29 and 31. The same result can be achieved by integrating the third lens with the second lens plate. In practice, this means that each lens of the second lens plate is wedge-shaped. Moreover, an integrator system has the advantage that a light beam coming from the light source and being, for example circular in cross-section can be converted into a light beam having a rectangular cross-section whose aspect ratio corresponds to that of the picture display panel, for example, 4:3. For detailed information relating to an integrator system as described above, reference is made to U.S. Pat. Nos. 5,098,184 and 5,184,248.

FIG. 6a shows only four lenses 33 in the vertical direction. Actually, the first lens plate 29 comprises, for example, 8×6 lenses. Each of the lenses 35 of the second lens plate 31 may function as an illumination element. However, if the second lens plate 35 comprises 8×6 lenses, groups of lenses 35 are preferably formed, for example, eight groups of six lenses, because only a number of illumination elements of the order of 10 is required. Each of the eight groups of six lenses 35 then plays the role of an illumination element. This is illustrated in FIG. 6b in which only four illumination elements are shown. Instead of the lenses themselves, the illumination elements 11 are shown in this Figure. To realize that a number of lenses 35 of the second lens plate 31 jointly constitute one illumination element, a prism may be integrated with each of the lenses 33 of the first lens plate 29.

Figure 7:
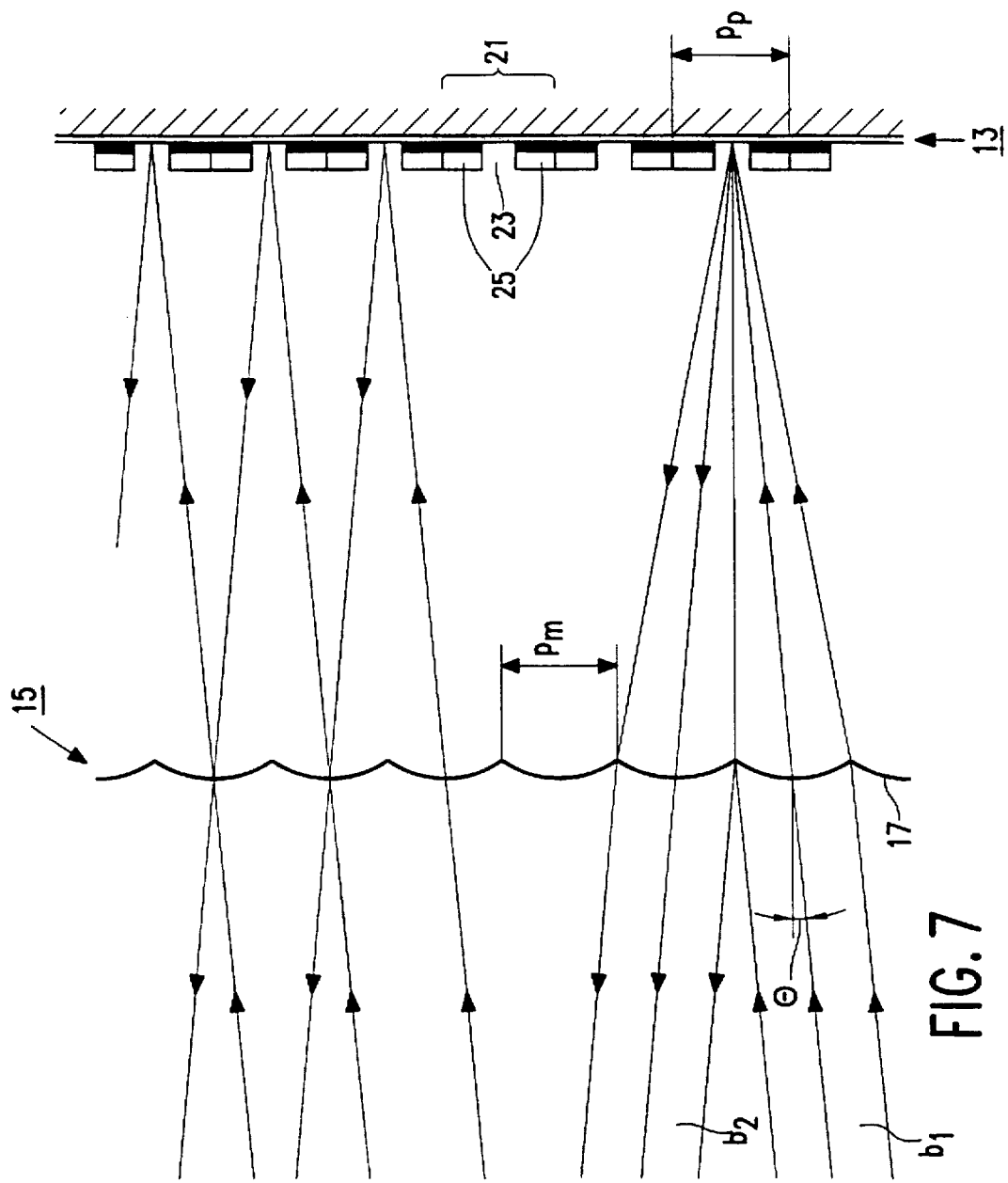
FIG. 7 shows an embodiment of a part of a picture display device according to the invention, in which the picture display panel is a reflective picture display panel.

In the embodiments described above, the picture display panel is a transmissive picture display panel. However, the picture display panel may alternatively be a reflective picture display panel. If the operation of the reflective picture display panel is based on the modulation of the direction of polarization of light incident thereon, the on-going beam $b_1$ to be modulated and the returning, modulated beam $b_2$ may be separated from each other by means of a polarization-separating element. However, if the operation of the reflective picture display panel is based on the dispersive effect, the beams cannot be separated and the beam $b_1$ to be modulated and the modulated beam $b_2$ will have to be spatially separated from each other so as to distinguish them. This may be realized, for example, by causing the beam to be modulated to be incident at an angle θ on the microlens array, as is shown in FIG. 7. The size of the angle θ determines the extent of spatial separation.

To increase the efficiency of the illumination system, the shape of the surface of the secondary light sources, for example, the shape of the surface of the lenses or of the groups of lenses of the second lens plate of an integrator system may be adapted to the shape of the active portions of the pixels of the picture display panel, and the configuration may be adapted to the configuration of the pixels. For example, if the pixels are arranged in a delta configuration, the illumination elements should also be arranged in a delta configuration. The configuration of the pixels rather than their shape determines the configuration of the illumination elements. Moreover, for an optimum result, the configuration of the microlenses should also be adapted to the configuration of the pixels. In said example, the microlenses are therefore arranged in a delta configuration. Their shape is not important but the fact that they adjoin each other is important, so that their shape is generally determined automatically. In this way, each pixel is optimally illuminated without any loss of intensity.

Figure 8A:
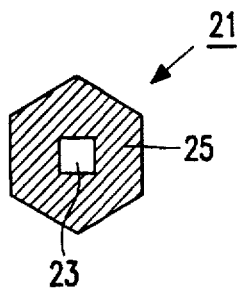
FIGS. 8a and 9a each show a possible shape of a pixel.
Figure 8B:
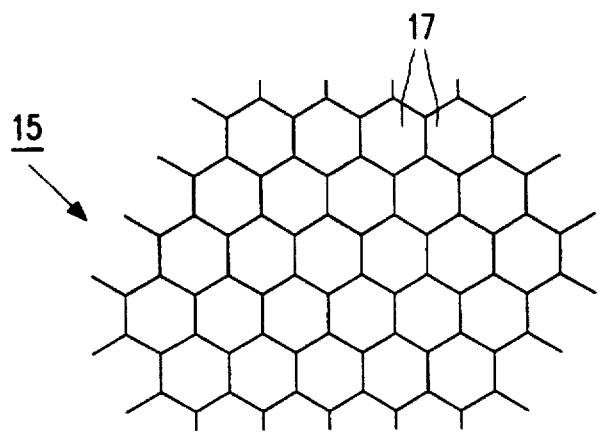
FIGS. 8b and 9b show a microlens array associated with these shapes.
Figure 8C:
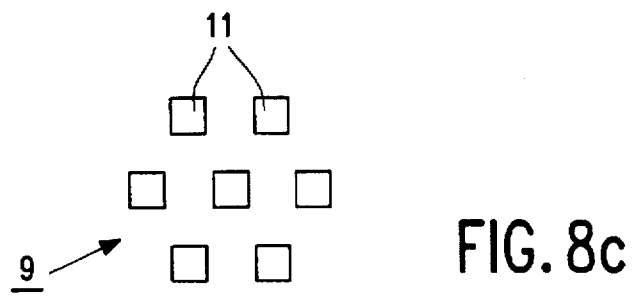
FIGS. 8c and 9c show a possible spatial distribution of the illumination elements.
Figure 9A:
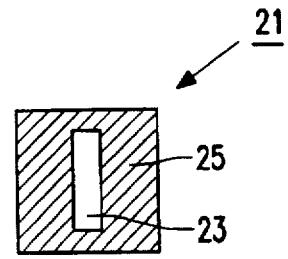
Figure 9B:
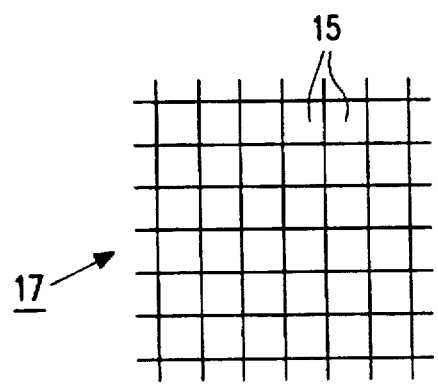
Figure 9C:
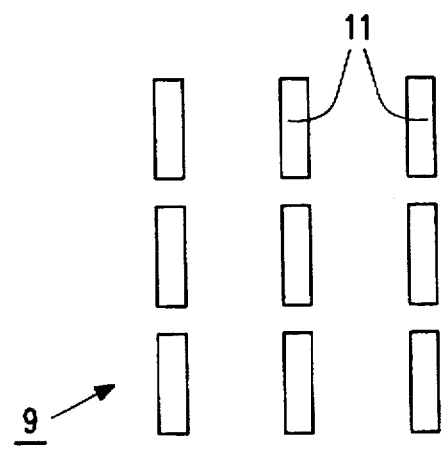

FIGS. 8 and 9 show examples of optimum combinations of shapes and configurations of the pixels, the microlens arrays and the illumination elements.

In FIG. 8a, the complete pixel is hexagonal and the pixels are arranged in a delta configuration, whereas the active portion is square-shaped. The microlenses 17 of the microlens array 15 are thus also arranged in a delta configuration. The shape they have is determined, inter alia, by the requirement that they should adjoin each other (FIG. 8b). The configuration corresponds to the configuration of the pixels 21. FIG. 8c shows that the illumination elements 11 are arranged in a delta configuration, in other words, they correspond to the configuration of the pixels 21. The illumination elements 11 are square-shaped, thus corresponding to the shape of the active portion 23 of the pixels 21.

FIG. 9a shows the total pixel 21 in a square shape and the pixels are arranged in a square configuration, while the active pixel portion 23 is rectangular. The microlenses of the associated microlens array are therefore arranged in a square configuration, as is shown in FIG. 9b. The shape of the microlenses does not play any role. The illumination elements 11, the radiation surface shape of which corresponds to the shape of the active portion 23 of a pixel 21, are also arranged in a square configuration.

FIG. 10 shows an embodiment in which the pitch $p_m$ of the microlenses is an integral multiple of the pitch $p_p$ of the pixels. This means that not every pixel is illuminated by all illumination elements. In FIG. 10, each microlens 17 corresponds to two pixels 21, so that each pixel will be irradiated by half the number of illumination elements. The picture intensity will thus be slightly decreased, but the advantage is that the microlens array can be manufactured more easily, which is particularly advantageous for picture display panels with relatively small pixels. The illumination elements A, B, C, D, E and F are imaged on the pixels a, b, c, d, e and f, respectively. For lens i, this is shown on panel 13, for lens i+1 on panel 13' and for lens i+2 on panel 13". It follows that the pixel which is illuminated via lens i by illumination element A will be irradiated via lens i+1 by illumination element C and via lens i+2 by illumination element E. The pixels 21 can thus be divided into two groups. One group is irradiated by the illumination elements A, C and E, and the other group is illuminated by the illumination elements B, D and F. In the example shown, each pixel 21 thus receives light from three illumination elements. FIG. 10 only shows the radiation path for the lens i.

In practice, it is generally ensured that the microlens array is slightly larger than the picture display panel and has more microlenses than the picture display panel so as to irradiate also the outer pixels of the picture display panel in an equal manner.

In all embodiments of the picture display device according to the invention, the arrays of pixels, microlenses and illumination elements are shown in one dimension. These arrays are, of course, two-dimensional arrays.

We claim:

1. A picture display device comprising an illumination system, a picture display panel provided with a matrix of n pixels and having a pitch $p_p$, and a projection lens system, the illumination side of the picture display panel provided with a microlens array comprising m microlenses and having a pitch $p_m$, wherein: the illumination system comprises N illumination elements which are arranged in an array, have a pitch $p_1$ and generate light simultaneously, in which $N<<M, n$ and $p_1>>p_m, p_p$, the microlens array and the picture display panel are arranged in a telecentric configuration, and it holds for the pitch $P_1$ of the array of illumination elements and the pitch $p_p$ of the picture display panel that:

$$M \cdot p_1 = p_p$$

and for the pitch $p_m$ of the microlens array and the pitch $p_p$ of the picture display panel:

$$p_m = x \cdot p_p$$

in which M is the magnification of the microlens array and x is an integer.

2. A picture display device as claimed in claim 1, characterized in that the illumination elements have a radiation surface with a shape corresponding to the shape of the active portions of the pixels of the picture display panel.

3. A picture display device as claimed in claim 2, characterized in that the illumination system comprises an integrator system with a first lens plate and a second lens plate each comprising a plurality of lenses arranged in an array, the lenses of the second lens plate constituting an array of illumination elements.

4. A picture display device as claimed in claim 2, characterized in that the illumination system comprises an integrator system with a first lens plate and a second lens plate each comprising a plurality of lenses arranged in an array, the illumination elements being constituted by a group of adjoining lenses of the second lens plate.

* * * * *